(12) United States Patent
Houlihane et al.

(10) Patent No.: US 8,055,950 B2
(45) Date of Patent: Nov. 8, 2011

(54) METHOD AND APPARATUS FOR IMPROVED TIMING FOR TRACE SYNCHRONIZATION

(75) Inventors: Thomas Sean Houlihane, Bassingbourn (GB); John Michael Horley, Hauxton (GB)

(73) Assignee: ARM Limited, Cambridge (GB)

( * ) Notice: Subject to any disclaimer, the term of this patent is extended or adjusted under 35 U.S.C. 154(b) by 401 days.

(21) Appl. No.: 12/007,580

(22) Filed: Jan. 11, 2008

(65) Prior Publication Data

US 2009/0183034 A1 Jul. 16, 2009

(51) Int. Cl.
G06F 11/00 (2006.01)
(52) U.S. Cl. .......................................................... 714/45
(58) Field of Classification Search .................... 714/45; 717/128
See application file for complete search history.

(56) References Cited

U.S. PATENT DOCUMENTS

| | | | |
|---|---|---|---|
| 7,219,333 B2 * | 5/2007 | Agarwala et al. ............. | 717/128 |
| 2002/0161989 A1 * | 10/2002 | Swaine ........................ | 712/227 |
| 2003/0154028 A1 * | 8/2003 | Swaine et al. .................... | 702/1 |
| 2003/0229823 A1 * | 12/2003 | Swaine et al. ................. | 714/25 |
| 2004/0024995 A1 * | 2/2004 | Swaine ........................ | 712/227 |
| 2004/0117607 A1 | 6/2004 | Swoboda | |
| 2004/0153813 A1 * | 8/2004 | Swoboda ........................ | 714/36 |
| 2004/0158776 A1 * | 8/2004 | McCullough et al. .......... | 714/45 |
| 2005/0033553 A1 * | 2/2005 | Swaine et al. ................. | 702/176 |
| 2005/0039078 A1 * | 2/2005 | Bradley et al. .................. | 714/25 |
| 2005/0268177 A1 * | 12/2005 | John ............................. | 714/47 |
| 2006/0005083 A1 * | 1/2006 | Genden et al. ................. | 714/47 |
| 2006/0184835 A1 | 8/2006 | Al-Omari et al. | |
| 2007/0067508 A1 | 3/2007 | Chai et al. | |
| 2008/0155353 A1 * | 6/2008 | Craske ............................ | 714/45 |
| 2008/0288741 A1 * | 11/2008 | Lee et al. ........................ | 711/200 |
| 2009/0150728 A1 * | 6/2009 | Barlow et al. .................. | 714/718 |
| 2009/0183034 A1 * | 7/2009 | Houlihane et al. ............... | 714/45 |

OTHER PUBLICATIONS

Office Action mailed Apr. 18, 2011 in co-pending U.S. Appl. No. 12/385,319.

* cited by examiner

*Primary Examiner* — Philip Guyton
(74) *Attorney, Agent, or Firm* — Nixon & Vanderhye P.C.

(57) ABSTRACT

A data processing apparatus having one or more trace data sources is provided in which the trace data sources operate to generate respective streams of trace data. At least one of said trace data sources comprises a trace data generator responsive to activity in monitored circuitry to generate trace data representing said activity. A synchronization marker generator is coupled to the trace data generator and operates to generate a synchronization marker and insert the synchronization marker into the trace data stream. The synchronization marker identifies a synchronization position in the trace data stream. A controller is coupled to the synchronization marker generator, and operates to initiate the synchronization marker generator to generate and insert a synchronization marker into the trace data stream. The controller controls initiation in dependence on behaviour of the data processing apparatus downstream of the trace data generator with respect to trace data flow. In this way, the downstream behaviour of the data processing apparatus can be made to influence the rate and timing of insertion of synchronization markers into a trace data stream, thereby reducing the likelihood of the volume of trace data resulting in an overflow condition in the downstream circuitry.

24 Claims, 7 Drawing Sheets

METHOD AND APPARATUS FOR IMPROVED TIMING FOR TRACE SYNCHRONIZATION

BACKGROUND OF THE INVENTION

1. Field of the Invention

This invention relates to trace synchronization. More particularly, this invention relates to a data processing apparatus and a data processing method which control the insertion of synchronization markers into a trace data stream to enable the synchronization of the trace data.

2. Description of the Prior Art

In a data processing apparatus, there are two main methods of facilitating debugging. The first method is to use debugging techniques such as setting breakpoints to halt code execution at a specific activity and to use a debug connection between the data processing apparatus and an external debugging apparatus to examine the status of the data processing apparatus at the breakpoint. The second method is to use trace monitoring to collect from the data processing apparatus, in real time, data representing instruction execution and/or data transfers, and to deliver the data to a trace analysis apparatus. One architecture which provides for this type of trace monitoring is the ARM Embedded Trace Macrocell architecture.

Data collected from a data processing apparatus for trace monitoring purposes is referred to as trace data. The trace data may be generated by trace data sources within the data processing apparatus which receive data signals from respective elements of the data processing apparatus which are associated with the trace data sources. Examples of such elements include a central processing unit, a coprocessor and a DMA (Direct Memory Access) controller. The trace data may then be temporarily stored in a trace buffer before being delivered externally of the data processing apparatus via a trace port.

Trace data is typically compressed to reduce the amount of trace data which needs to be stored and transferred. In order to analyse a stream of trace data in this case, the position of individual data frames may need to be determined, and the decompression routines initialised. To enable these processes to be achieved, various special synchronisation packets may be inserted into the trace data. The nature of the compression, and the nature of the circuit which is being traced may mean that the rate at which trace data is generated varies considerably over time.

It may frequently be the case that more trace data will be generated than is captured for later processing. Synchronisation data should therefore preferably be inserted with sufficient frequency to allow that data which is captured to be processed. The synchronisation process may itself be capable of generating a large amount of trace data in a short time.

Where multiple trace data sources are used to generate trace data corresponding to multiple respective elements of the data processing apparatus, the amount of trace data generated at a particular time may become large. In this case, the insertion of synchronization information into the trace data stream may result in overflow conditions within the trace monitoring circuitry of the data processing apparatus.

SUMMARY OF THE INVENTION

Viewed from one aspect the present invention provides a data processing apparatus having one or more trace data sources, said trace data sources operating to generate respective streams of trace data, at least one of said trace data sources comprising:

a trace data generator responsive to activity in monitored circuitry to generate trace data representing said activity;

a synchronization marker generator coupled to said trace data generator, said synchronization marker generator operating to generate a synchronization marker and insert said synchronization marker into said trace data stream, said synchronization marker identifying a synchronization position in said trace data stream; and a controller coupled to said synchronization marker generator, said controller operating to initiate said synchronization marker generator to generate and insert said synchronization marker into said trace data stream; wherein said controller controls initiation in dependence on behaviour of said data processing apparatus downstream of said trace data generator with respect to trace data flow.

In this way, the downstream behaviour of the data processing apparatus can be used to influence the rate and timing of insertion of synchronization markers into a trace data stream, thereby reducing the likelihood of the volume of trace data, which is increased by the insertion of synchronization markers, causing an overflow condition in the downstream circuitry. For instance, the controller may monitor an amount of trace data accepted by downstream circuitry of the data processing apparatus to determine the downstream behaviour. Where the amount of trace data accepted by the downstream circuitry is relatively small, this may be taken as indicative that the downstream circuitry is heavily loaded, possibly with trace data generated by another trace data source. In this case, it would not be appropriate to insert a synchronization marker into the trace data, because the resulting increase in the amount of trace data would increase the loading on the downstream circuitry and may result in an overload condition. Where the amount of trace data accepted by the downstream circuitry is relatively large, this may be taken as indicative that the downstream circuitry is not overloaded. In this case, it may be assumed that a synchronization marker may safely be inserted into the trace data without significant risk of overloading the downstream circuitry.

Alternatively, the trace data sources may each include a local buffer coupled to the trace data generator and downstream thereof to receive and store the trace data generated by the trace data generator. The local buffer may be coupled to the synchronization marker generator and downstream thereof to receive and store synchronization markers generated by the synchronization marker generator, or alternatively the synchronization markers may be inserted downstream of the local buffer. A local buffer is particularly useful where trace data is likely to be generated at a relatively low average data rate, but in bursts. Accordingly, where a local buffer is provided, the controller controls initiation of the generation and insertion of a synchronization marker into the trace data stream in dependence on a current utilisation or a current free capacity of the local buffer. Accordingly, the insertion of synchronization markers into the trace data stream via the local buffer may be inhibited while the current utilisation of the local buffer is low and/or until sufficient free space is available in the local buffer. This will reduce the problem of overflowing the local buffers, and may reduce the likelihood of overloading circuitry downstream of the local buffer, because the current utilisation of the local buffer, and the current free capacity of the local buffer will be related to the rate of take up of trace data from the local buffer by the downstream circuitry. Moreover, if the threshold for synchronisation insertion is set fairly low, the rate of insertion becomes more sensitive to the state of the downstream circuitry.

The generation and insertion of synchronization markers may be initiated in dependence on a synchronization request. Synchronization requests may arise in several different ways.

In particular, the trace data source may comprise a counter, and the counter may operate to generate the synchronization requests at periodic intervals. In this way, regular synchronization of the trace data stream can be provided. The periodic intervals may correspond to either a predetermined duration or a predetermined amount of generated trace data. Another example is that synchronization requests may be invoked by an external device or element of the data processing apparatus.

The data processing apparatus may also include a trace buffer which operates to store trace data generated by the plurality of trace data sources. The stored trace data can then be extracted from the trace buffer out of real-time for analysis. The data processing apparatus may also include a trace buffer state monitor which monitors a volume of trace data being stored into the trace buffer. The trace buffer state monitor then generates a synchronization request each time a predetermined volume of trace data has been stored into the trace buffer. In this way, synchronization markers can be distributed throughout the trace data stored within the trace buffer at a desired separation.

The trace buffer which captures the trace data is usually a circular buffer, which means that initial start-up trace data may not necessarily be present in the captured trace since it may have been overwritten. Also, where the trace buffer is large, trace tools might capture a large amount of data but it may not be desirable to analyse all of the trace. In this case, analysis may be started at random or predetermined points in the trace buffer.

Generally, synchronization markers will be generated and inserted into the trace data stream in response to synchronization requests only when specific criteria associated with the downstream behaviour of the data processing apparatus are satisfied. However, the controller may control initiation of the synchronization marker generator when a synchronization request has remained unsatisfied for a predetermined duration. In this way, it is possible to ensure that trace data is not left unsynchronized for too long, even if the insertion of a synchronization marker may risk overflowing internal buffers or overloading the downstream circuitry.

Synchronization markers may take several forms. For instance, the synchronization marker may comprise a predetermined code and/or a data packet. In the case of a predetermined code, the code may be a particular pattern of bits which are inserted into the trace data stream to identify the type of data which follows the code. The trace data generated by each trace data generator may be compressed trace data. In this case, each synchronization marker may provide an initialisation point for decompression of the compressed trace data. Where the trace data is compressed, since compression techniques are used to efficiently pack the trace information, synchronization points are inserted into the trace stream. The synchronization points in this case may be points at which data is output in its full, rather than compressed, form to enable decompression to start from that point.

The trace data stream may be represented by several different aspects, for instance alignment, instructions, data and timestamps. Accordingly, the synchronization marker generator may generate and insert a plurality of different synchronization markers corresponding to respective different aspects of the trace data stream into the trace data stream. Further, the controller may optionally control initiation of the synchronization marker generator to generate and insert one or more of the plurality of different synchronization markers in accordance with a predetermined priority associated with each of the different synchronization markers. The different synchronization markers may include an alignment synchronization marker for identifying a packet boundary alignment of said trace data stream, an instruction synchronization marker for identifying a memory address of an instruction within said trace data stream, a data synchronization marker for identifying a memory address of a unit of data within said trace data stream, and a time stamp synchronization marker for identifying a time stamp position within said trace data stream.

Each aspect of the trace data stream should preferably be synchronized to permit full use to be made of the trace data. To enable efficient use of a trace buffer, it would be sensible to synchronize all of these at the same time. However, synchronization usually requires a large amount of additional data to be generated, which could result in internal buffers overflowing, or a corresponding increase in the size of the internal buffers used. The problems associated with synchronization are multiplied in larger systems with multiple processors and multiple sources of trace data.

It is desirable to reduce the occurrence of the overflowing condition while keeping synchronization points close together. It is also desirable to reduce the requirement for a complex synchronization request distribution scheme, which would become increasingly harder to implement in a large system made up of sub-system elements. Previously, synchronization points have been alternated within the trace data at a fixed synchronization frequency. This has the disadvantage that instruction synchronization might be attained, but data synchronization is not achieved for a much greater period of time, resulting in wasted trace, or trace where data addressed could not be properly decoded. These problems and disadvantages are addressed by embodiments of the present invention by synchronizing, in response to a synchronization request, at a first opportunity in dependence on the loading conditions on downstream circuitry. This can have an effect of moving the synchronization of instructions and data closer together.

In systems with multiple trace sources, if all devices synchronize at the same time, they might all attempt to push trace data onto a trace bus at the same time, causing a bottleneck in the trace capture system. Embodiments of the present invention seek to smooth the generation of trace data, adapting to the requirements of the capture system. Previously, there had been no correlation between the synchronization of separate trace sources, and schemes to stagger the insertion of synchronization positions had been considered. A system which staggered the different synchronization from different sources would have resulted in a guaranteed amount of trace data which would need to be discarded before all sources where synchronized. Embodiments of the present invention seek to reduce the need to implement a mechanism for staggering synchronization between sources, and to enable all sources to be synchronized at near to the same time (within the constraints of available bandwidth).

Some trace protocols require data synchronization to be performed on the first data transfer after instruction synchronization. This has the potential to overflow internal buffers by requiring uncompressed data to be output at specific times in the protocol. Other trace protocols do not place any requirements on the relationship between the various forms of synchronization, thereby potentially wasting trace data because the different synchronization points are too far apart in the trace.

The insertion of data and instruction synchronization can be delayed if the trace generation logic is in the process of inserting other trace packets. With embodiments of the present invention, a trace source can delay the insertion of synchronization markers until sufficient bandwidth is available. In this way, the system does not need to be aware of synchronization points in detail. This makes it possible to make better use of the available buffers in each trace source, and may avoid having to increase the size of those buffers purely to support periodic synchronization, which would be more area and power inefficient. This is especially important when considering multiple trace sources, since each source would need a larger FIFO.

The data processing apparatus may also comprise funnel circuitry arranged to receive trace data streams from two or more trace data sources. The funnel circuitry will in this case operate to combine trace data streams output by the two or more trace data sources to form a combined trace data stream. This is achieved by selecting between the two or more trace data sources to form the combined trace data stream in accordance with predetermined rules. The trace data sources may have respective priority values associated with them, and the predetermined rules will in this case determine how to arbitrate between the trace data sources to give preference to higher priority sources without causing trace data from one or more of the trace data sources to be ignored.

The plurality of trace data sources may be used to monitor the operation of a wide variety of elements of the data processing apparatus. For instance, the monitored circuitry may comprise a processor, a bus or a memory controller.

Viewed from another aspect the present invention provides a method of generating one or more trace data streams, comprising the steps of:

generating trace data representing activity of monitored circuitry;

generating a synchronization marker identifying a synchronization position in said trace data stream;

inserting said synchronization marker into said trace data stream; and initiating generation and insertion of said synchronization marker into said trace data stream; wherein said initiation is controlled in dependence on behaviour downstream of said trace data generation with respect to trace data flow.

Viewed from another aspect the present invention provides a data processing apparatus having one or more trace data sources, said trace data sources operating to generate respective streams of trace data, at least one of said trace data sources comprising:

means for generating trace data representing activity of monitored circuitry;

means for generating a synchronization marker identifying a synchronization position in said trace data stream;

means for inserting said synchronization marker into said trace data stream; and means for initiating generation and insertion of said synchronization marker into said trace data stream; wherein said initiation is controlled in dependence on behaviour of said data processing apparatus downstream of said means for generating trace data with respect to trace data flow.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
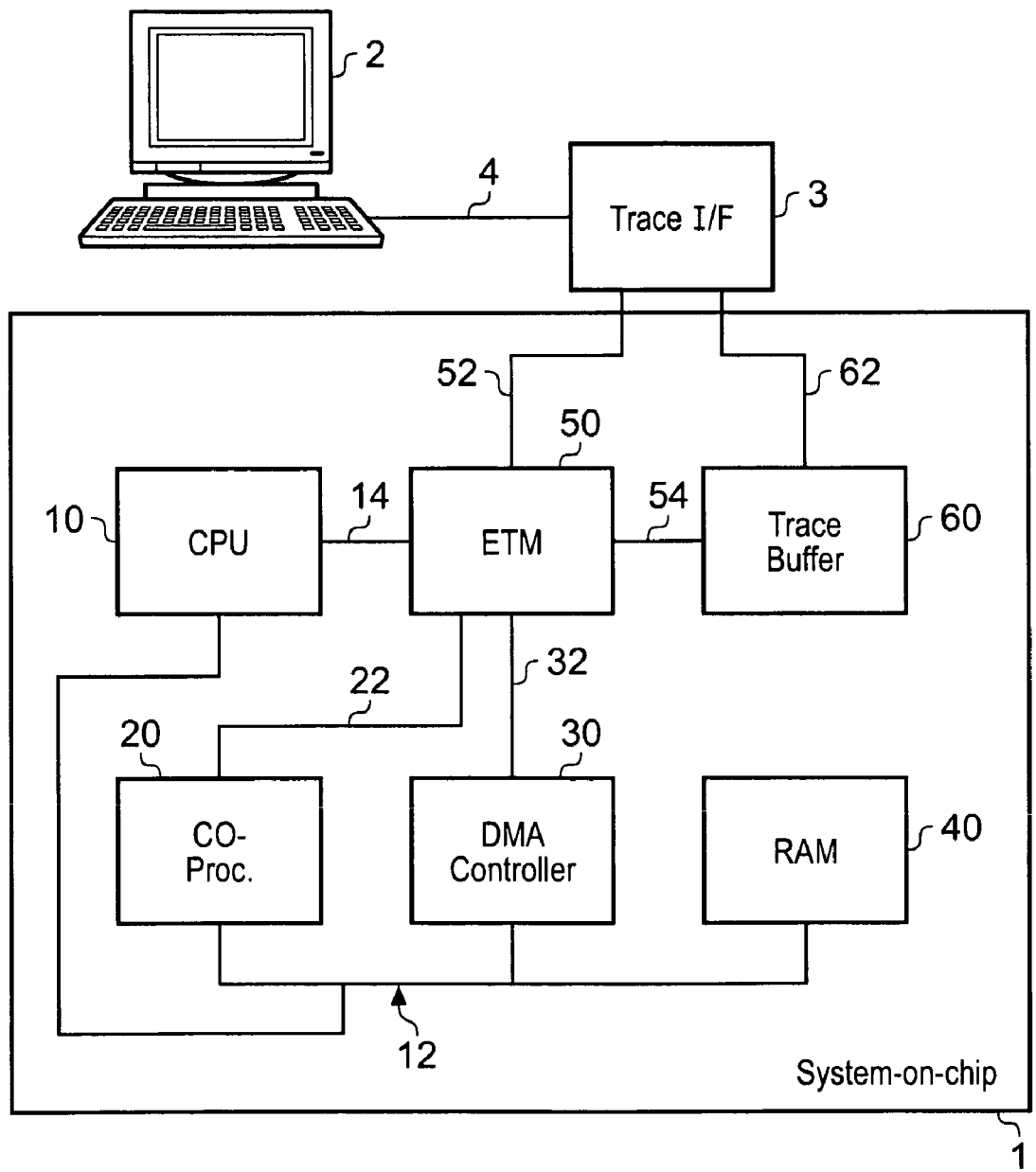
FIG. 1 schematically illustrates an integrated circuit having trace data generation circuitry, and a trace analysis apparatus connected to the integrated circuit.

Referring to FIG. 1, an integrated circuit 1, in this case a system-on-chip circuit, is illustrated. The integrated circuit 1 is coupled to a trace analysis apparatus 2 via a trace interface 3. The trace analysis, apparatus may be a general purpose data processing apparatus provided with the necessary software and hardware to connect to the integrated circuit 1 via the trace interface 3, and to perform the required analysis on trace data output from the integrated circuit 1. Trace data generated by the integrated circuit 1 is provided to the trace analysis apparatus 2 via the trace interface 3, and a trace information line 4 connecting the trace analysis apparatus 2 to the trace interface 3.

The integrated circuit 1 comprises a central processing unit 10, a coprocessor 20, a DMA controller 30, and a memory 40, in this case a random access memory (RAM). The central processing unit 10, the coprocessor 20, the DMA controller 30 and the memory 40 are coupled together via a bus 12. The integrated circuit 1 also comprises and embedded trace macrocell (ETM) unit 50 and a trace buffer 60, which together serve to generate and store trace data associated with one or more of the central processing unit 10, the coprocessor 20 and the DMA controller 30. In particular, the embedded trace macrocell unit 50 receives trace related signals from the central processing unit 10 via a signal line 14, from the coprocessor 20 via a signal line 22, and from the DMA controller 30 via a signal line 32. The embedded trace macrocell unit 50 generates trace data from the signals received on the signal lines 14, 22, 32 and outputs the generated trace data to one or both of the trace interface 3, via a signal line 52, and to the trace buffer 60 via a signal line 54. The trace buffer 60 is a circular buffer arranged to store the most recent portion of trace data generated by the embedded trace macrocell unit 50. The trace buffer 60 is operable to output trace data to the trace interface 3 via a signal line 62 when required by the trace analysis apparatus 2.

Figure 2:
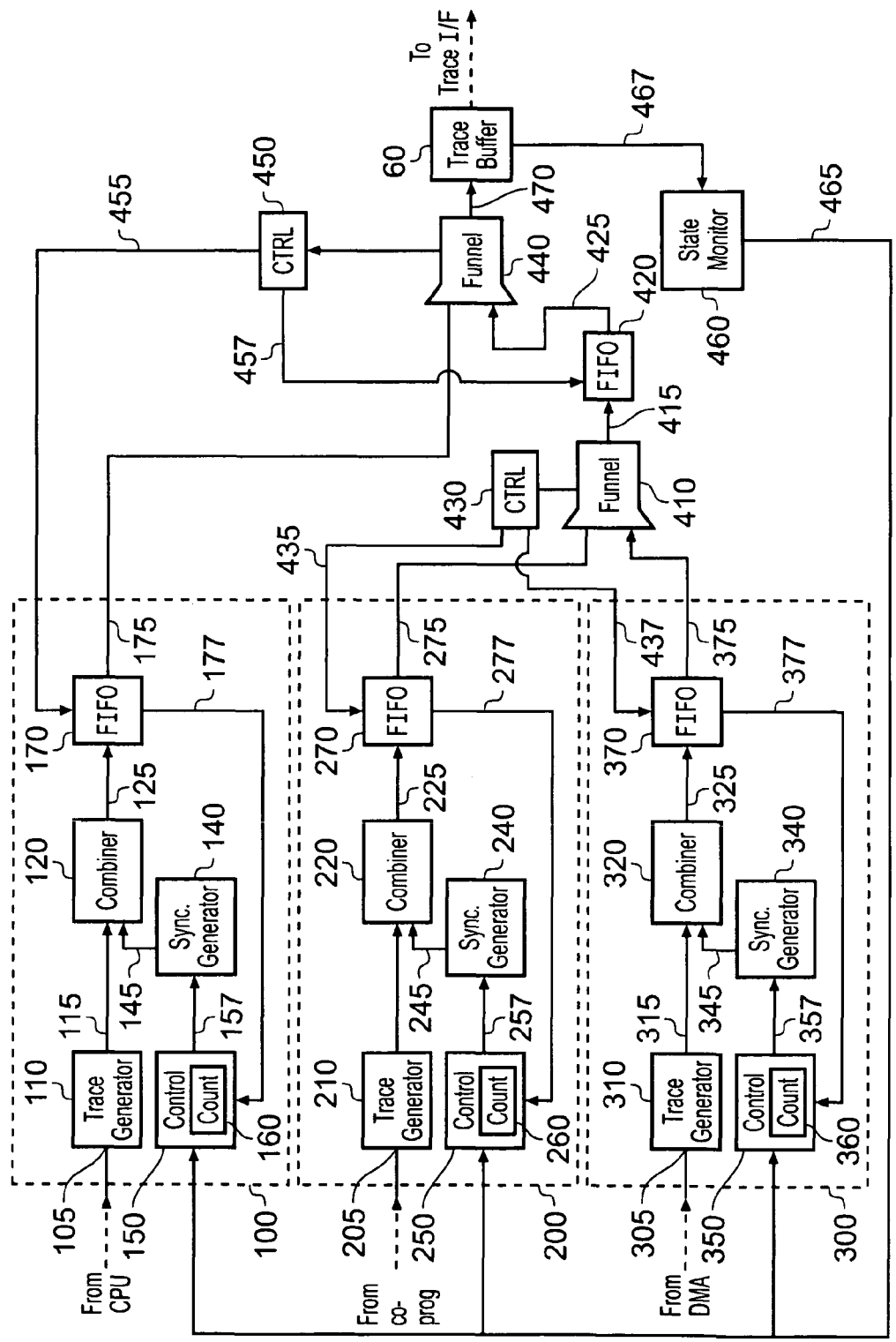
FIG. 2 schematically illustrates an example configuration of trace data generation circuitry having multiple trace data sources.

In FIG. 2, an example configuration of trace data generation circuitry of the embedded trace macrocell unit 50 of FIG. 1 is illustrated. The trace data generation circuitry of FIG. 2 comprises a plurality of trace data sources each generating trace data associated with a particular component of the integrated circuit 1. In particular, a first trace data source 100 generates trace data associated with the central processing unit 10 of FIG. 1, a second trace data source 200 generates trace data associated with the coprocessor 20 of FIG. 1, and a trace data source 300 generates trace data associated with the DMA controller 30 of FIG. 1. Accordingly, it will be appreciated that each of the trace data sources 100, 200, 300 is operable to generate a respective stream of trace data. It will further be appreciated that each of the trace data sources 100, 200, 300 may not generate trace data at all times. This is because when the associated element of the integrated circuit 1 is inactive, no trace data need be generated.

The different trace data sources may also have differing levels of importance with respect to each other. For instance, trace data associated with the central processing unit 10 may be deemed relatively important, whereas trace data associated with the DMA controller 30 may be deemed relatively less important. Accordingly, it may be acceptable to lose trace data from the DMA controller 30, but not from the central processing unit 10. This may result in the trace data associated with the central processing unit 10 being captured very regularly and frequently, while it may be sufficient to capture the trace data associated with the DMA controller 30 less frequently. In the present example trace data is provided to the trace analysis apparatus 2 in a signal stream, either directly, or after being stored into the trace buffer 60, and so it is necessary to multiplex the separate streams of trace data generated by the respective trace data sources 100, 200, 300 into a single output stream. It is further necessary to arbitrate between the trace data sources 100, 200, 300 so that an appropriate mix of trace data from the respective trace data sources 100, 200, 300 can be multiplexed into the single output stream.

The multiplexing and arbitration functions are conducted by funnel circuitry and associated control logic respectively. In particular, in FIG. 2 a funnel 410 is shown to receive trace data outputs from the second trace data source 200 and the third trace data source 300. The funnel 410 has a single output signal line 415 onto which the inputs to the funnel 410 are to be multiplexed. The selection of which trace data output is to be multiplexed onto the output signal line 415 is carried out by control circuitry 430 associated with the funnel 410. An example selection method will be discussed below with reference to FIG. 4. The multiplexed trace data stream output onto the signal line 415 is stored into a first-in-first-out (FIFO) buffer 420 which is operable to subsequently output the data on demand in the order in which it has been stored. The output of the FIFO buffer 420 is applied to a signal line 425 which forms an input of a further funnel 440. The other input of the funnel 440 is the trace data stream output from the first trace data source 100. The second funnel 440 has associated control circuitry 450 which serves to select which of the output of the first trace data source 100 and the trace data stream stored in the FIFO buffer 420 is to be multiplexed onto an output signal line 470 to be stored into the trace buffer 60. In this way, the outputs of the respective trace data sources 100, 200, 300 can be selectively multiplexed into a single trace data stream and stored in the trace buffer 60.

The amount of data being stored into the trace buffer 60 is continuously monitored by a state monitor 460 which is coupled to the trace buffer 60 via a signal line 467. Each time a predetermined amount of data has been stored into the trace buffer, the state monitor 460 generates a global synchronization request and communicates it to each of the trace data sources 100, 200, 300 on a signal line 465. The global synchronization request indicates that synchronization markers should be inserted into the respective trace data streams generated by the trace data sources 100, 200, 300 to enable synchronization of the trace data to take place.

The first trace data source 100 has an input 105 at which signals indicative of the activity of the central processing unit 10 are received. A trace generator 110 is provided which generates trace data in dependence on the signal received at the input 105, and which outputs the generated trace data onto a signal line 115 which is connected to a combiner 120. The first trace data source 100 also comprises a synchronization marker generator 140 which generates synchronization markers under the control of a controller 150 of the first trace data source and outputs the synchronization markers onto a signal line 145 to the combiner 120. At the combiner, the synchronization markers generated by the synchronization generator 140 are combined into the trace data stream generated by the trace generator 110. The combined trace data stream is then output from the combiner 120 to a FIFO buffer 170 via a signal line 125. The FIFO buffer 170 is operable to store up to a predetermined amount of generated trace data, including synchronization markers, and to output it to the funnel 440 on a signal line 175 in response to a control signal from the control circuitry 450 on a signal line 455.

The FIFO buffer 170 is operable to inform the controller 150 of the current free capacity of the FIFO buffer 170 using a signal line 177. The controller 150 is able to use this information to determine when synchronization markers should be inserted into the trace data generated by the trace generator 110. The controller 150 comprises a counter unit 160 which is operable to perform counting functions related to the generation of periodic synchronization requests and to the forcing of synchronization marker insertion when a predetermined amount of time has passed or a predetermined amount of data has been generated since a synchronization request had last occurred.

The second trace data source 200 has an input 205 at which signals indicative of the activity of the coprocessor 20 are received. A trace generator 210 is provided which generates trace data in dependence on the signal received at the input 205, and which outputs the generated trace data onto a signal line 215 which is connected to a combiner 220. The second trace data source 200 also comprises a synchronization marker generator 240 which generates synchronization markers under the control of a controller 250 of the first trace data source and outputs the synchronization markers onto a signal line 245 to the combiner 220. At the combiner, the synchronization markers generated by the synchronization generator 240 are combined into the trace data stream generated by the trace generator 210. The combined trace data stream is then output from the combiner 220 to a FIFO buffer 270 via a signal line 225. The FIFO buffer 270 is operable to store up to a predetermined amount of generated trace data, including synchronization markers, and to output it to the funnel 410 on a signal line 275 in response to a control signal from the control circuitry 430 on a signal line 435.

The FIFO buffer 270 is operable to inform the controller 250 of the current free capacity of the FIFO buffer 270 using a signal line 277. The controller 250 is able to use this information to determine when synchronization markers should be inserted into the trace data generated by the trace generator 210. The controller 250 comprises a counter unit 260 which is operable to perform counting functions related to the generation of periodic synchronization requests and to the forcing of synchronization marker insertion when a predetermined amount of time has passed or a predetermined amount of data has been generated since a synchronization request had last occurred.

The third trace data source 300 has an input 305 at which signals indicative of the activity of the DMA controller 30 are received. A trace generator 310 is provided which generates trace data in dependence on the signal received at the input 305, and which outputs the generated trace data onto a signal line 315 which is connected to a combiner 320. The second trace data source 300 also comprises a synchronization marker generator 340 which generates synchronization markers under the control of a controller 350 of the first trace data source and outputs the synchronization markers onto a signal line 345 to the combiner 320. At the combiner, the synchronization markers generated by the synchronization generator 340 are combined into the trace data stream generated by the trace generator 310. The combined trace data stream is then output from the combiner 320 to a FIFO buffer 370 via a signal line 325. The FIFO buffer 370 is operable to store up to a predetermined amount of generated trace data, including synchronization markers, and to output it to the funnel 410 on a signal line 375 in response to a control signal from the control circuitry 430 received on a signal line 437.

The FIFO buffer 370 is operable to inform the controller 350 of the current free capacity of the FIFO buffer 370 using a signal line 377. The controller 350 is able to use this information to determine when synchronization markers should be inserted into the trace data generated by the trace generator 310. The controller 350 comprises a counter unit 360 which is operable to perform counting functions related to the generation of periodic synchronization requests and to the forcing of synchronization marker insertion when a predetermined amount of time has passed or a predetermined amount of data has been generated since a synchronization request had last occurred.

In some cases, several aspects of synchronization need to be considered, including alignment synchronization to obtain packet boundary alignment, instruction synchronization to obtain an instruction address, data synchronization to obtain a data address, and timestamp synchronization to identify a particular point in time. In this case, for each of the trace sources 100, 200, 300, when a periodic synchronization request is invoked by the respective counter 160, 260, 360, the respective controller 150, 250, 350 will perform each type of synchronization, possibly in a predefined order). Synchronization might be delayed if the state of the internal buffer of the trace source indicates that there is insufficient space in the sources internal buffer.

These synchronization markers can take up to tens or hundreds of times the average data generated in a single processor cycle in total, so synchronizing all forms might cause an overflow if a the trace data source has a small internal FIFO. This has previously required that additional space be allocated in the FIFO to allow for synchronization. The synchronization points may preferably be provided in the above order, since this may be the most efficient order (in terms of discarded data) for some types of trace protocol. Each type of synchronization may be arranged to occur only if there is more than a predefined (hard-wired or configurable) amount of space in the FIFO. For example, if 30 bytes of space are available, alignment synchronization might occur. Once the amount of space in the FIFO has again dropped below the predefined level, the next form of synchronization might occur. This procedure would continue until all forms of synchronization have occurred. The predefined level for each type of synchronization may be different, and this may help to improve the likelihood that the synchronization sequence will complete properly even in a heavily loaded system. In one alternative implementation, only one of the synchronization events might be provided in the FIFO or be generated at any one time. This would avoid the need to monitor the capacity of the FIFO and would be suitable if the FIFO were relatively small, or the rate at which trace packets are generated were low.

The present technique seeks to provide a reasonable slack in the FIFO at all times, to thereby avoid overflow even if a large trace event occurs. It may also provide that if multiple trace sources are competing for bandwidth on a trace bus then the source will not synchronize until some of its trace data has been extracted onto the bus. This makes use of the fact that it is not important exactly when a synchronization packet is inserted into the FIFO, but it is preferable for them to be inserted close together, and more preferably in a specific order. Some protocols may require additional synchronization at well specified time in the trace stream. If these events occur whilst a periodic synchronization is being delayed due to the FIFO state, the pending periodic synchronization packet can be replaced by the specific synchronization packet. This might cause an overflow, but the situation is no worse than it would be without using the present synchronization technique.

Figure 3:
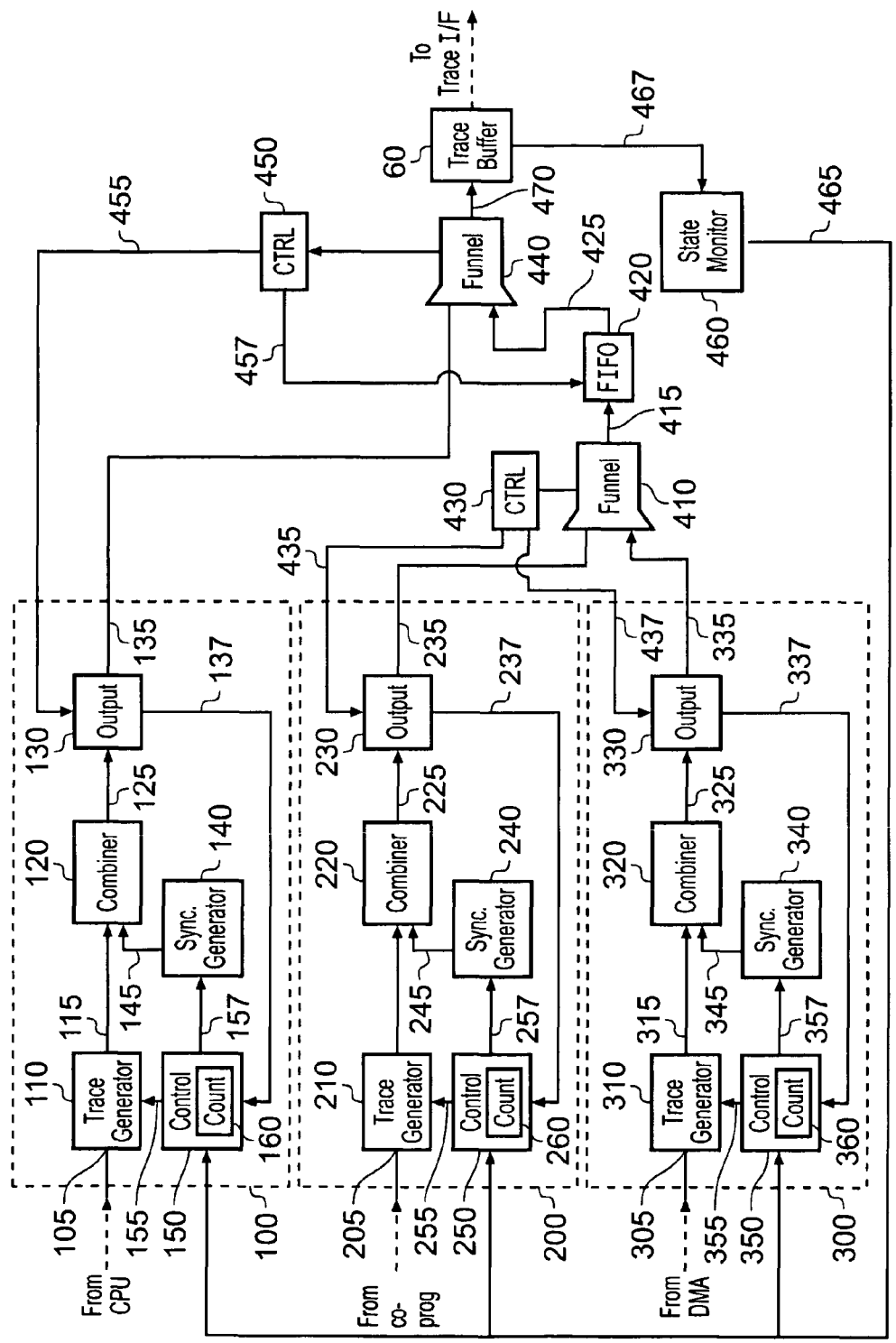
FIG. 3 schematically illustrates another example configuration of trace data generation circuitry having multiple trace data sources.

In FIG. 3, an alternative example configuration of trace data generation circuitry of the embedded trace macrocell unit 50 of FIG. 1 is illustrated. As with FIG. 2, the trace data generation circuitry of FIG. 3 comprises a plurality of trace data sources each generating trace data associated with a particular component of the integrated circuit 1. To the extent that the features of FIG. 3 are identical to those of FIG. 2, these features will not be described again. The structural difference between FIG. 2 and FIG. 3 is the replacement of the FIFO buffers in the trace data sources of FIG. 2 with simple output units in the trace data sources of FIG. 3.

In particular, in the first trace data source 100, an output unit 130 is provided which receives combined trace data and synchronization markers from the combiner 120. The output unit 130 is responsive to a control signal received from the control circuitry 450 on a signal line 455 to output trace data to the funnel 440. If data is not to be output, then it may either be discarded, or the generation of further trace data by the trace generator 110 may be stalled. The output unit 130 is operable, using a signal line 137, to inform the controller 150 that data has been output from the output unit 130 to the funnel 440. In this way, the controller 150 is able to monitor the acceptance of trace data by the downstream circuitry to determine when to insert synchronization markers into the trace data generated by the trace generator 110.

In the second trace data source 200, an output unit 230 is provided which receives combined trace data and synchronization markers from the combiner 220. The output unit 230 is responsive to a control signal received from the control circuitry 430 on a signal line 435 to output trace data to the funnel 410. If data is not to be output, then it may either be discarded, or the generation of further trace data by the trace generator 210 may be stalled. The output unit 230 is operable, using a signal line 237, to inform the controller 250 that data has been output from the output unit 230 to the funnel 410. In this way, the controller 250 is able to monitor the acceptance of trace data by the downstream circuitry to determine when to insert synchronization markers into the trace data generated by the trace generator 210.

In the third trace data source 300, an output unit 330 is provided which receives combined trace data and synchronization markers from the combiner 320. The output unit 330 is responsive to a control signal received from the control circuitry 430 on a signal line 437 to output trace data to the funnel 410. If data is not to be output, then it may either be discarded, or the generation of further trace data by the trace generator 310 may be stalled. The output unit 330 is operable, using a signal line 337, to inform the controller 350 that data has been output from the output unit 330 to the funnel 410. In this way, the controller 350 is able to monitor the acceptance of trace data by the downstream circuitry to determine when to insert synchronization markers into the trace data generated by the trace generator 310.

Figure 4:
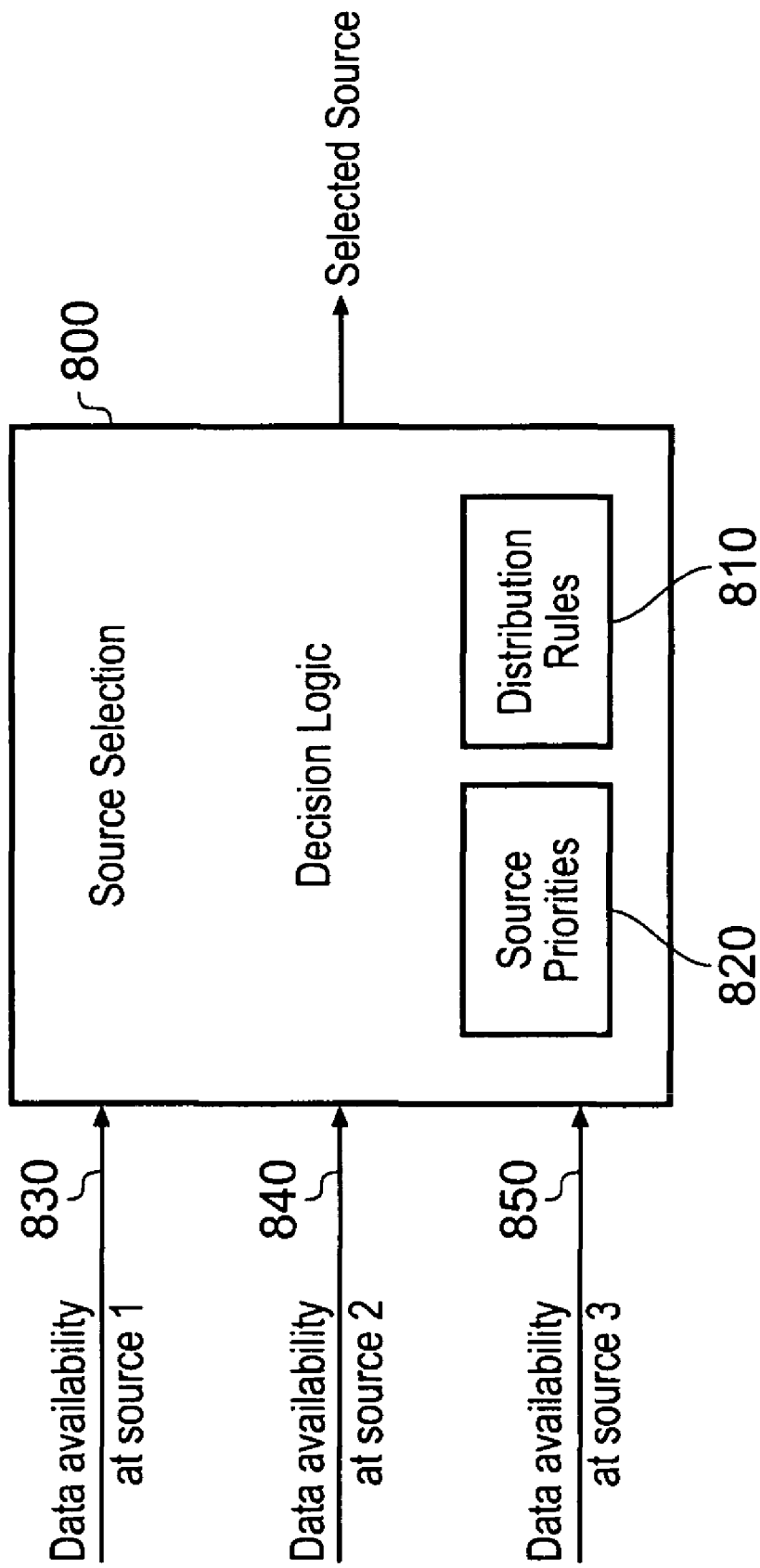
FIG. 4 schematically illustrates source selection decision logic which selects one of a plurality of outputs from trace data sources to be output for analysis

Referring to FIG. 4, source selection decision logic 800 for selecting between the respective trace data sources 100, 200, 300 is schematically illustrated. The selection of trace data sources for output is determined in dependence on the availability of data at each of the respective data sources, priorities 820 associated with the respective trace data sources, and distribution rules 810 for specifying the arbitration between the trace data sources such that the trace data output from each of the trace data sources 100, 200, 300 is appropriately represented in the output trace data stream. In particular, the source selection decision logic 800 receives a first input 830 representing the data availability at the first trace data source, a second input 840 representing the data availability at the second trace data source, and a third input 850 representing the data availability at the third trace data source 300. In the present case the source priorities 820 and the distribution rules 810 are determined in advance, and are hard wired into the integrated circuit. However, in an alternative embodiment one or both of the source priorities 820 and the distribution rules 810 may be user programmable. The source selection decision logic defines the selection of inputs for the first funnel 410 and the second funnel 440 made by the control circuitry 430 and the control circuitry 450 of FIGS. 2 and 3, and defines the signals applied to the signal lines 455, 457, 435, 437 which indicate to the trace data output blocks or buffers that trace data has been accepted.

Figure 5:
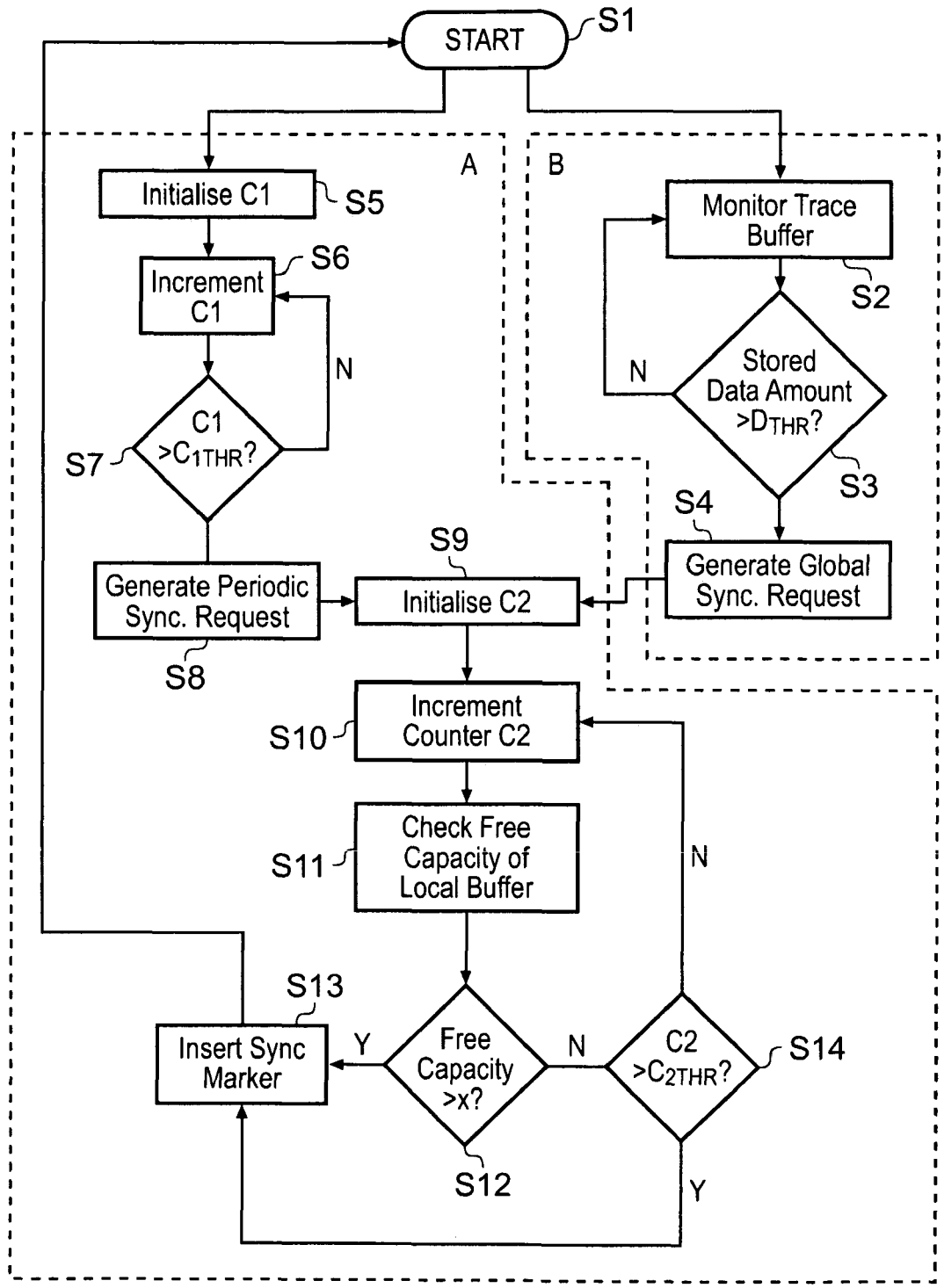
FIG. 5 is a schematic flow diagram illustrating a process for generating and servicing synchronization requests in accordance with the example configuration of trace data generation circuitry illustrated in FIG. 2.

Referring to FIG. 5, a schematic flow diagram is illustrated which represents a method of generating and servicing synchronization requests in accordance with the example configuration of trace data generation circuitry illustrated in FIG. 2. The method starts at a step S1 and commences in parallel with two processes. A first process, corresponding to the operation of a trace data source, is represented by the steps shown within the bounded area A of FIG. 5. A second process, corresponding to the generation of global synchronization requests by the state monitor of FIG. 2, is represented by the steps shown within the bounded area B of FIG. 5.

Referring first to the steps relating to the generation of the global synchronization request, at a step S2 the trace buffer is monitored to determine an amount of data which has been stored into the trace buffer. At a step S3, it is determined whether the amount of data stored into the trace buffer has exceeded a threshold amount $D_{THR}$. If the amount of data stored into the trace buffer has not exceeded this threshold amount then processing returns to the step S2 where the trace buffer will be monitored for further data input. If it is determined at the step S3 that the amount of data stored into the trace buffer has exceeded the threshold amount $D_{THR}$, then processing moves on to a step S4 where a global synchronization request is generated and communicated to each of the data sources. In this way, a global synchronization request is generated whenever a certain amount of data has been stored into the trace buffer, which should result in synchronization markers being provided at intervals throughout the trace data stored into the trace buffer. In parallel with the process of the steps S2 to S4, a process for generating periodic synchronization requests using the counter unit of a trace data source is executed. In particular, at a step S5 a first counter, C1 is initialised in the counter unit, and then at a step S6 is incremented. At a step S7, it is determined whether the value of C1 exceeds a predetermined threshold $C_{1THR}$. If the threshold value $C_{1THR}$ has not been exceeded, then processing returns to the step S6 whereby the counter is incremented again. In this way, the steps S6 and S7 will repeat until the value of C1 exceeds the threshold $C_{1THR}$, or until the counter is reinitialised. When at the step S7 it is determined that the value of C1 has exceeded the threshold $C_{1THR}$, then at a step S8 a periodic synchronization request is generated. While in the present case the counter C1 is incremented as a function of time, the counter C1 could instead be incremented each time a certain amount of data has been generated by the trace data source.

At a step S9, in response to the generation of either a global synchronization request at the step S4, or a periodic synchronization request at the step S8, a second counter, C2 is initialised by the counter unit of the trace data source. Then, at a step S10, C2 is incremented. At a step S11, the free capacity of a local buffer associated with the trace data source is checked, and is compared, at a step S12 with a threshold amount x. If at the step S12, it is determined that the free capacity of the local buffer is greater than the threshold amount x, then processing moves to a step S13 where a synchronization marker is inserted into the trace data stream output by the trace data source. If on the other hand it is determined at the step S12 that the free capacity of the local buffer is less than the threshold capacity x, then processing proceeds to a step S14 where the value of the counter C2 is compared with a threshold amount $C_{2THR}$. If the value of C2 is greater than the threshold amounts $C_{2THR}$, then processing will progress to the step S13 where a synchronization marker will be inserted into the trace data steam output by the trace data source. Alternatively, if it is determined at the step S14 that the value of the counter C2 is less than the threshold amount $C_{2THR}$, then processing will return to the step S10 where C2 will be incremented. In this way a synchronization marker will be inserted into the trace data stream either when the free capacity local buffer is greater than a certain amount or when a predetermined time has lapsed as measured by the counter C2. This prevents synchronization requests being unsatisfied for too long, which would result in trace data which could not be synchronized, and would therefore be unusable.

Figure 6:
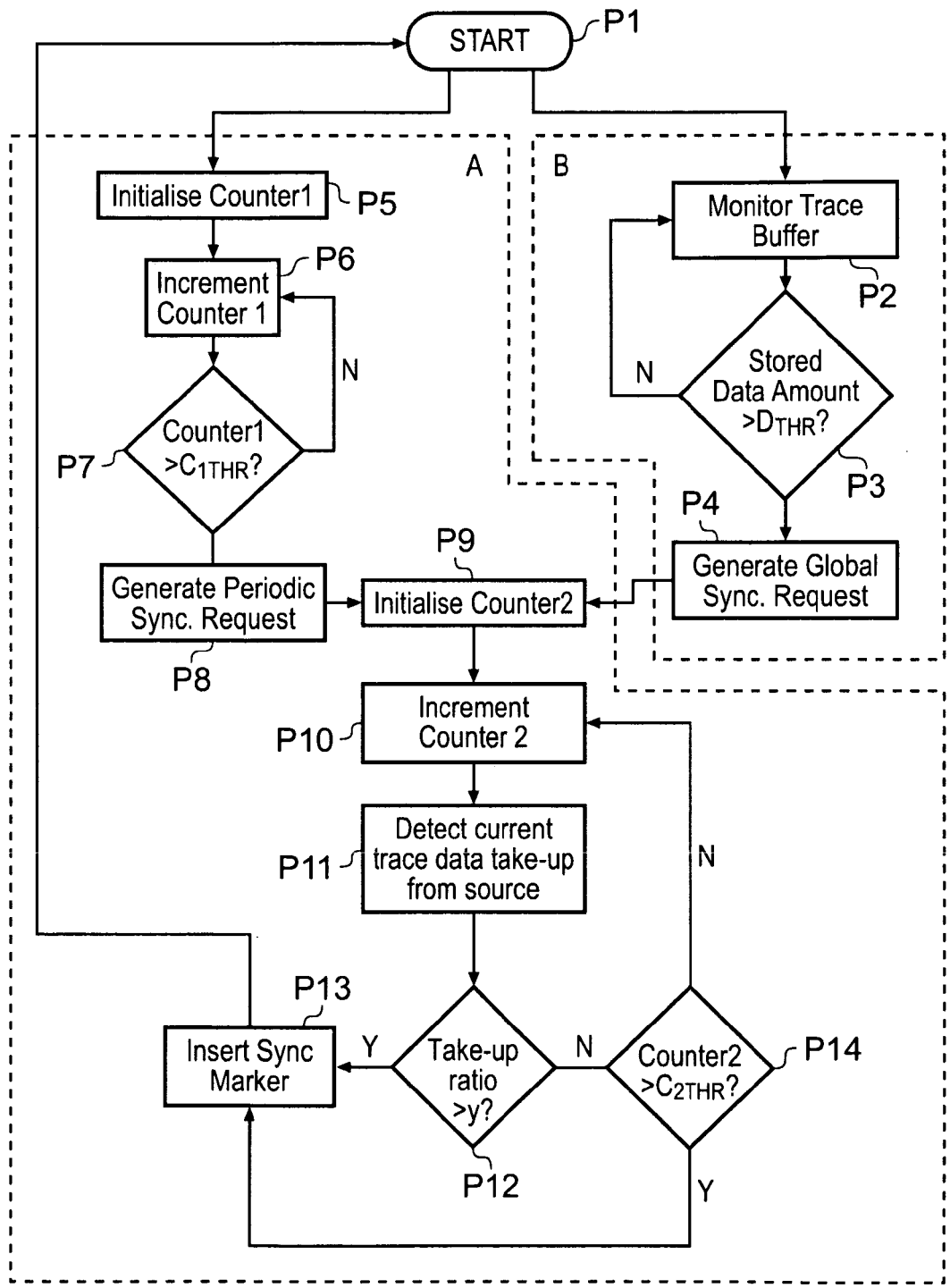
FIG. 6 is a schematic flow diagram illustrating a process for generating and servicing synchronization requests in accordance with the example configuration of trace data generation circuitry illustrated in FIG. 3.

In FIG. 6, a process for generating and servicing synchronization requests similar to that illustrated in FIG. 5 is presented. As with FIG. 5, the method commences in parallel with two processes. A first process, corresponding to the operation of a trace data source, is represented by the steps shown within the bounded area A of FIG. 6. A second process, corresponding to the generation of global synchronization requests by the state monitor of FIG. 3, is represented by the steps shown within the bounded area B of FIG. 6. Steps P1 to P10 of FIG. 6 correspond exactly to the steps S1 to S10 of FIG. 5, and therefore will not be described further.

Following the step P10 of FIG. 6, where a counter C2 (corresponding to the counter C2 of FIG. 5) is incremented, the current take up by the down stream circuitry of the trace data stream output from the trace data source is detected. The take up of data from the trace data source by the down stream circuitry may be determined as a ratio of the amount of trace data accepted from the trace data source by the downstream circuitry to the amount of trace data actually generated by the trace data source. Alternatively, other measures of take up could be used. It is then determined at a step P12 whether the take up ratio is greater than a threshold value y. If the take up ratio is greater than the threshold value y, then at a step P13 a synchronization marker is inserted into the trace data stream output by the trace data source. Alternatively, if it is determined at the step P12 that the take up ratio is not greater than the threshold value y then processing moves on to a step P14 where the value of the counter C2 is compared with the threshold $C_{2THR}$. If it is determined that the step P14 that the value of the counter C2 is greater than the threshold amount, $C_{2THR}$, then processing returns to the step P10 where the value of the counter C2 is again incremented. In this way a synchronization marker will be inserted into the trace data stream either when the take up ratio is greater than a certain amount or when a predetermined time has lapsed as measured by the counter C2. As with FIG. 5, this prevents synchronization requests being unsatisfied for too long, which would result in trace data which could not be synchronized, and would therefore be unusable.

Figure 7:
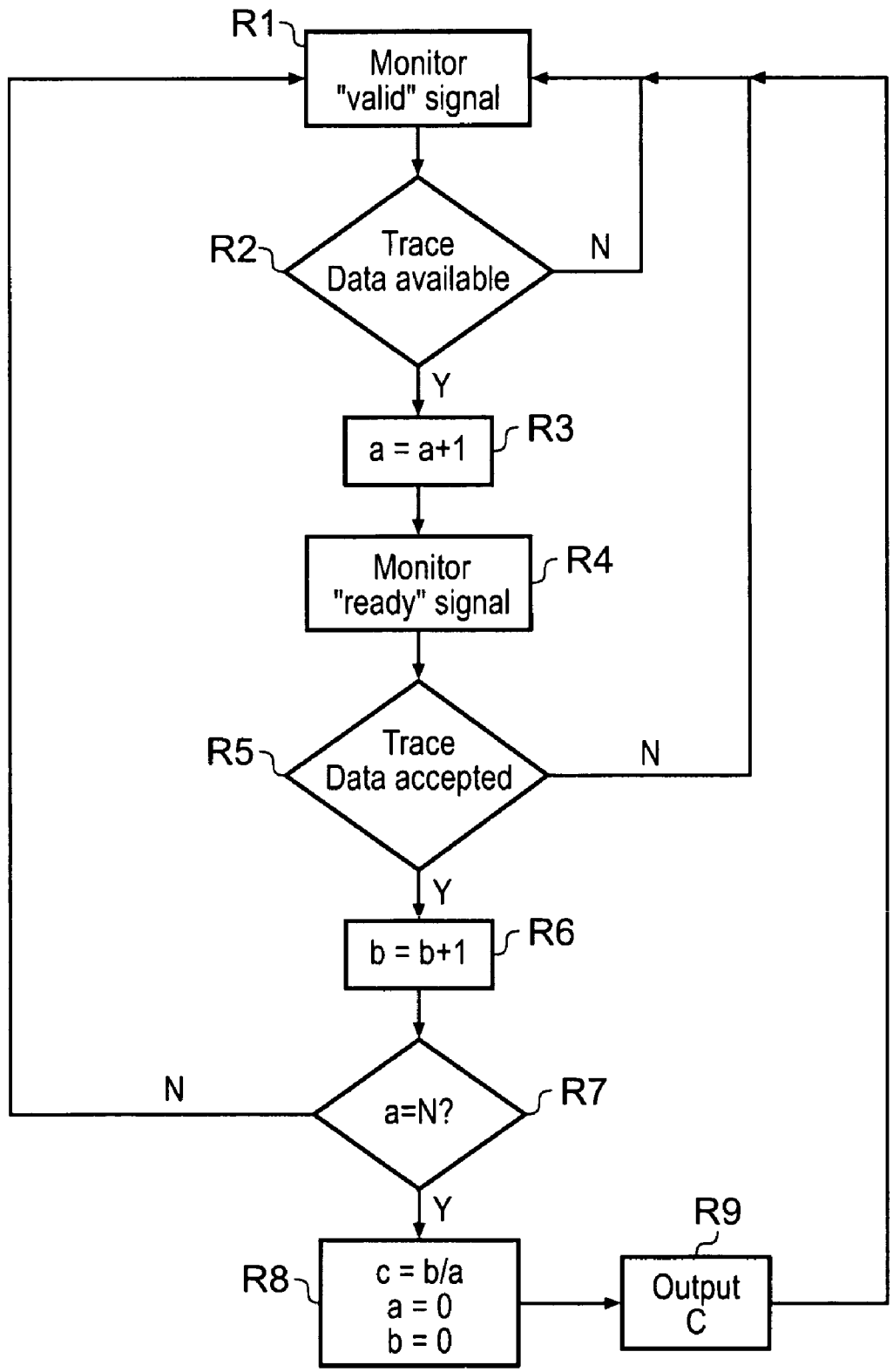
FIG. 7 is a schematic flow diagram illustrating a process for detecting the activity of downstream circuitry.

In FIG. 7, an example process for determining the take up ratio used in FIG. 6 to identify when synchronization markers should be inserted into the trace data stream is illustrated. The example process is illustrated with reference to the first trace data source 100 illustrated in FIG. 3, however it will be appreciated that a similar process may be applied in the case of the second and third trace data sources 200, 300. At a step R1 the controller 150 of the trace data source 100 monitors the signal line 137 to detect whether a trace data signal is available for output from the trace data source. If at a step R2, it is determined that trace data has been generated, and is therefore available at the trace data source, then at a step R3 a variable a is incremented. If at the step R2 it is determined that no trace data is available for output then the process of R1 and R2 will continue until trace data has been generated by the trace data source and is ready for output at the output unit 130.

Once the variable a has been incremented at the step R3, then at a step R4 the controller 150 monitors the signal line 137 to detect whether the trace data is being output from the trace data source and is therefore being accepted by the down stream circuitry. If at a step R5, it is determined that trace data has been accepted from the output unit 130, then at a step R6 a variable b is incremented. Alternatively, if that the step R5 it is determined that trace data has not been accepted from the trace data source, then processing will return to the step R1, where the controller 150 will resume monitoring the output unit 130 for trace data being ready for output.

When the variable b has been incremented at the step R6, then processing moves onto a step R7 where the variable a is compared with a value N. If the variable a is equal to the value N, then the process will move onto a step R8 where a variable c is calculated to be the ratio of the variable b to the variable a. The variables a and b are also initialised to zero at this stage. Then at a step R9, the variable c is output to represent the current take up ratio of the down stream circuitry. Processing then returns from the step R9 to the step R1. If, at the step R7 it is determined that the value of variable a is less than value N, then processing returns to the step R1. As such, the take up ratio for down steam circuitry is recalculated at every N cycles of the process of FIG. 7 and the most recent value of the take up ratio is continuously output at the step R9 for use in the step P11 of FIG. 6. As an alternative, the take-up ratio may be averaged over a period of recent trace data.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus having one or more trace data sources, said trace data sources operating to generate respective streams of trace data, at least one of said trace data sources comprising:
   a trace data generator responsive to activity in monitored circuitry to generate trace data representing said activity;
   a synchronization marker generator coupled to said trace data generator, said synchronization marker generator, responsive to a synchronization request, to generate a synchronization marker and insert said synchronization marker into said trace data stream, said synchronization marker identifying a synchronization position in said trace data stream; and
   a controller coupled to said synchronization marker generator, said controller operating to initiate said synchronization marker generator to generate and insert said synchronization marker into said trace data stream; wherein
   said controller controls the timing of initiation following the synchronization request in dependence on behaviour of said data processing apparatus downstream of said trace data generator with respect to trace data flow to delay the insertion of a synchronization marker into the trace data stream until sufficient bandwidth is determined to be available downstream.

2. A data processing apparatus according to claim 1, wherein said controller monitors an amount of trace data accepted by downstream circuitry of said data processing apparatus to determine said downstream behaviour.

3. A data processing apparatus according to claim 1, wherein said at least one of said trace data sources comprises:
   a local buffer coupled to said trace data generator and downstream thereof to receive and store said trace data generated by said trace data generator; and
   wherein said controller controls initiation of said generation and insertion of said synchronization marker into said trace data stream in dependence on a current free capacity of said local buffer.

4. A data processing apparatus according to claim 3, wherein
   said local buffer is coupled to said synchronization marker generator and downstream thereof to receive and store said synchronization marker generated by said synchronization marker generator.

5. A data processing apparatus according to claim 1, wherein
   said at least one of said trace data sources comprises a counter, said counter operating to generate said synchronization request at periodic intervals.

6. A data processing apparatus according to claim 5, wherein said periodic intervals correspond to one of a predetermined duration and a predetermined amount of generated trace data.

7. A data processing apparatus according to claim 1, comprising
   a trace buffer, said trace buffer operating to store trace data generated by said trace data sources; and
   a trace buffer state monitor, said trace buffer state monitor monitoring a volume of trace data being stored into said trace buffer and generating said synchronization request each time a predetermined volume of trace data has been stored.

8. A data processing apparatus according to claim 1, wherein said controller controls initiation of said synchronization marker generator when a synchronization request has been unsatisfied for a predetermined duration.

9. A data processing apparatus according to claim 1, wherein said synchronization marker comprises a predetermined code.

10. A data processing apparatus according to claim 1, wherein said synchronization marker comprises a data packet.

11. A data processing apparatus according to claim 1, wherein
said synchronization marker generator generates and inserts a plurality of different synchronization markers corresponding to respective different aspects of said trace data stream into said trace data stream.

12. A data processing apparatus according to claim 11, wherein
said controller controls initiation of said synchronization marker generator to generate and insert one or more of said plurality of different synchronization markers in accordance with a predetermined priority associated with each of said different synchronization markers.

13. A data processing apparatus according to claim 11, wherein one of said different synchronization markers is an alignment synchronization marker for identifying a packet boundary alignment of said trace data stream.

14. A data processing apparatus according to claim 11, wherein one of said different synchronization markers is an instruction synchronization marker for identifying a memory address of an instruction within said trace data stream.

15. A data processing apparatus according to claim 11, wherein one of said different synchronization markers is a data synchronization marker for identifying a memory address of a unit of data within said trace data stream.

16. A data processing apparatus according to claim 11, wherein one of said different synchronization markers is a time stamp synchronization marker for identifying a time stamp position within said trace data stream.

17. A data processing apparatus according to claim 1, comprising:
funnel circuitry arranged to receive trace data streams from two or more trace data sources, said funnel circuitry operating to combine trace data streams output by said two or more trace data sources to form a combined trace data stream; wherein
said funnel circuitry selects between said two or more trace data sources to form said combined trace data stream in accordance with predetermined rules.

18. A data processing apparatus according to claim 1, wherein said monitored circuitry comprises a processor.

19. A data processing apparatus according to claim 1, wherein said monitored circuitry comprises a bus.

20. A data processing apparatus according to claim 1, wherein said trace data generated by said trace data generator is compressed trace data.

21. A data processing apparatus according to claim 20, wherein said synchronization marker provides an initialisation point for decompression of said compressed trace data.

22. A method of generating in a data processing apparatus one or more trace data streams, comprising the steps of:
generating trace data representing activity of monitored circuitry;
generating, in response to a synchronization request, a synchronization marker identifying a synchronization position in said trace data stream;
inserting said synchronization marker into said trace data stream; and
initiating generation and insertion of said synchronization marker into said trace data stream; wherein
the timing of said initiation following said synchronization request is controlled in dependence on behaviour downstream of said trace data generation with respect to trace data flow to delay the insertion of a synchronization marker into the trace data stream until sufficient bandwidth is determined to be available downstream.

23. A data processing apparatus having one or more trace data sources, said trace data sources operating to generate respective streams of trace data, at least one of said trace data sources comprising:
means for generating trace data representing activity of monitored circuitry;
means for generating, responsive to a synchronization request, a synchronization marker identifying a synchronization position in said trace data stream;
means for inserting said synchronization marker into said trace data stream; and
means for initiating generation and insertion of said synchronization marker into said trace data stream; wherein
the timing of said initiation following the synchronization request is controlled in dependence on behaviour of said data processing apparatus downstream of said means for generating trace data with respect to trace data flow to delay the insertion of a synchronization marker into the trace data stream until sufficient bandwidth is determined to be available downstream.

24. A data processing apparatus having one or more trace data sources, said trace data sources operating to generate respective streams of trace data, at least one of said trace data sources comprising:
a trace data generator responsive to activity in monitored circuitry to generate trace data representing said activity;
a synchronization marker generator coupled to said trace data generator, said synchronization marker generator to generate a synchronization marker and insert said synchronization marker into said trace data stream, said synchronization marker identifying a synchronization position in said trace data stream;
a controller coupled to said synchronization marker generator, said controller operating to initiate said synchronization marker generator to generate and insert said synchronization marker into said trace data stream; wherein said controller controls initiation in dependence on behaviour of said data processing apparatus downstream of said trace data generator with respect to trace data flow and, wherein said controller controls initiation in dependence on a synchronization request;
a trace buffer, said trace buffer operating to store trace data generated by said trace data sources; and
a trace buffer state monitor, said trace buffer state monitor monitoring a volume of trace data being stored into said trace buffer and generating said synchronization request each time a predetermined volume of trace data has been stored.

* * * * *